US008452734B2

(12) United States Patent
Munegowda et al.

(10) Patent No.: US 8,452,734 B2
(45) Date of Patent: May 28, 2013

(54) FAT FILE IN RESERVED CLUSTER WITH READY ENTRY STATE

(75) Inventors: Keshava Munegowda, Bangalore (IN); Veeramanikandan Raju, Bangalore (IN); Madan Srinivas, Bangalore (IN); Rohit Joshi, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 409 days.

(21) Appl. No.: 12/762,829

(22) Filed: Apr. 19, 2010

(65) Prior Publication Data

US 2010/0280995 A1    Nov. 4, 2010

Related U.S. Application Data

(60) Provisional application No. 61/174,191, filed on Apr. 30, 2009.

(51) Int. Cl.
G06F 7/00 (2006.01)
G06F 17/00 (2006.01)

(52) U.S. Cl.
USPC .......................................................... 707/672

(58) Field of Classification Search
None
See application file for complete search history.

(56) References Cited

U.S. PATENT DOCUMENTS

| 5,974,426 | A | 10/1999 | Lee et al. |
| 6,742,079 | B1 | 5/2004 | Kuschak |
| 7,174,420 | B2 | 2/2007 | Malueg et al. |
| 7,340,647 | B2 | 3/2008 | Aashaim et al. |
| 7,363,540 | B2 | 4/2008 | Patel et al. |
| 7,613,738 | B2 | 11/2009 | Patel et al. |
| 7,702,659 | B2 | 4/2010 | Ban et al. |
| 7,747,664 | B2 | 6/2010 | Patel et al. |
| 2002/0143976 | A1* | 10/2002 | Barker et al. ................. 709/231 |
| 2009/0287874 | A1 | 11/2009 | Rogers et al. |

OTHER PUBLICATIONS

Kwon, M.S., et al. KFAT: Log-based Transactional FAT Filesystem for Embedded Mobile Systems. Proc. 2005 US-Korea Conf., 2005, ICTS-142. 6 pp., FIGS. 1-4.

* cited by examiner

*Primary Examiner* — Uyen T. Le
(74) *Attorney, Agent, or Firm* — Lawrence J. Bassuk; W. James Brady; Frederick J. Telecky, Jr.

(57) ABSTRACT

A computer device (2010) has a file system having clusters and meta data. The computer device (2010) includes a processor (1030) and a storage (1025) coupled to the processor and having physical representations of instructions so that the processor is operable to reserve (230) at least one of the clusters and to create a log record when meta data for the file system is to be updated by a write (240) of such meta data beforehand to such a reserved cluster, and then set (250) at least one state entry to substantially represent readiness to write the meta data to the file system.

1 Claim, 10 Drawing Sheets

FAT FILE IN RESERVED CLUSTER WITH READY ENTRY STATE

CROSS-REFERENCES TO RELATED APPLICATIONS

This application is related to provisional U.S. Patent Application "TI-PFAT: Power-Fail Safe FAT File System" Ser. No. 61/174,191 (TI-64923PS), filed Apr. 30, 2009, for which priority is claimed under 35 U.S.C. 119(e) and all other applicable law, and which is incorporated herein by reference in its entirety.

U.S. Published Patent Application 2008-0307240 "Power Management Electronic Circuits, Systems, and Methods and Processes of Manufacture" dated Dec. 11, 2008 (TI-60478) is incorporated herein by reference in its entirety.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

BACKGROUND

The FAT (File Allocation Table) file system is a file system for mobile phones and other embedded devices for Multimedia applications such as MP3, video images and recording. FAT is Microsoft Windows PC (personal computer) compatible. Such a file system, as well as any file system with similar properties under a given operating system, has an hierarchical tree-like structure such as with directories, subdirectories and files in them. A root directory is a directory that not a subdirectory of any directory, i.e. at a root of the tree. Opening Windows Explorer on a Windows PC pictorially shows the hierarchical tree-like structure, and there the directories and subdirectories are called folders.

However, if a device with FAT is used as removable storage media, the FAT file system is or may be susceptible to lose, or incorrectly update file system Meta data and User data due to uncontrolled power failures. In this context, the contents of a file are referred to as User data. The Directory entry structure data of a File/directory and associated FAT table entries are referred to as Meta data. In electronic embedded system environments the loss or corruption of data is undesirable.

A conventional FAT (File Allocation Table) file system thus apparently is not power-fail safe. If there is a power failure while modifying the files or directories, the integrity of the Meta data of the file system is not guaranteed, meaning the user might be unable to access any of the stored files. Logging file system transactions might be used, but prior FAT variants suffer from one or more of the following drawbacks: 1) Performance degradation, 2) Unsuitability for removable media, 3) Need for additional hardware, 4) Not all transactions are power fail safe, 5) No dynamic logging space allocation.

Some FAT-related approaches are noted next. KFAT: Log based transactional FAT file system for embedded mobile systems, in Proceedings of 2005 US-Korea Conference, ICTS-142, 2005. This file system apparently maintains the log of file system operations in a normal file created in root directory of the FAT file system.

U.S. Pat. No. 5,974,426 discloses a Device and method for data recovery in a file system. It apparently maintains recovery information in the non-volatile memory. If a crash occurs, then during reboot the file system is updated using this recovery information. This method apparently undesirably requires an additional SRAM coupled with Flash memory.

U.S. Pat. No. 7,174,420 discloses TFAT: Transaction Safe FAT File system. This File system apparently does not maintain any log information of the file system operation. Instead FAT2 is updated first with the requested file system operation. Upon successful completion of a transaction, the FAT2 file is copied to FAT1. If a power-failure occurs while updating FAT2, then apparently the contents of FAT2 are completely ignored and entire FAT1 is copied to FAT2. Presumably this means slow performance because the entire FAT table needs to be updated. In TFAT, write operations made to the root directory of FAT16 are apparently not transaction safe either.

U.S. Pat. No. 6,742,079, File system for avoiding loss of data, maintains extra sectors as reserved sectors to store the file system logs. This File system for avoiding data loss can declare the required sectors for logging operations as reserved sectors apparently only during file system format. If the FAT file system is formatted by a Windows PC with only one reserved sector, then this File system apparently cannot store file system logs due to unavailability of sectors.

Accordingly, some ways of providing much better file allocation table file systems would be very desirable in the art.

SUMMARY OF THE INVENTION

Generally, one form of the invention involves a computer device with a file system having clusters and meta data. The computer device includes a processor and a storage coupled to the processor and having physical representations of instructions so that the processor is operable to reserve at least one of the clusters and to create a log record, when meta data for the file system is to be updated, by a write of such meta data beforehand to such a reserved cluster, and then set at least one state entry to substantially represent readiness to write the meta data to the file system.

Generally, another form of the invention involves an electronic system that includes at least one storage holding instructions for a routine and part of the storage is operable to hold files and meta data and at least one log record having meta data and at least one state entry substantially representing a state as ready or committed, and a processor coupled to the storage and operable according to the routine to process to the at least one state entry depending on such ready, committed, and lack thereof and to execute a response thereto.

Generally, a further form of the invention involves a storage device that includes a memory, and a single power fail safe file system operable both for storing data that is to be resistant to power loss and operable as a file system for Windows PC compatibility and having only one file allocation table.

Generally, a process form of the invention involves a power management process for use with a battery-powered file system, the process including a low-battery mode that enables file system operation to automatically activate crash-resilient logging when the battery is low, and disable the logging when the battery is more fully-charged.

Generally, another further form of the invention involves a media device for use with a processor having an operating system that prevents clusters specified as reserved from being modifiable by a user of the processor, the media device including a connector, and a memory coupled to the connector and including a file system including log data written to clusters specified as reserved whereby file system log data are protected when the device is connected or disconnected.

Generally, a still further form of the invention involves an electronic system that includes a power circuit subject to a power fail event, a processor and associated operating system, and a modem having a real-time operating system, and a power-fail-safe file system coupled with both the modem and the processor to protect at least some data for the modem, the processor operable to utilize that same file system.

Generally, a further process form of the invention involves a process for a computer device operable with clusters, the process including marking at least one of the clusters as reserved in a file allocation table; and a Logging operation that includes creating a log record, for use when meta data for a file is updated, by writing meta data to a reserved cluster, and setting a state entry of the log record and a corresponding entry in a master log record as ready in connection with writing the log record.

Generally, a testing process form of the invention involves a testing process for a device with a file system, the process including providing a device with a file allocation table-based file system having reserved clusters, retrieving contents of the reserved clusters as a first test file, creating a data file and writing data therein, retrieving contents of the reserved clusters again as a second test file, comparing the contents of the first test file and second test file, and if different as regards amount of clusters, then the test passes, and if same then fails.

Various other file systems, processes, circuits, devices and electronic systems are also disclosed and claimed.

Corresponding numerals in different Figures indicate corresponding parts except where the context indicates otherwise. A minor variation in capitalization or punctuation for the same thing does not necessarily indicate a different thing. A suffix .i or .j refers to any of several numerically suffixed elements having the same prefix.

DETAILED DESCRIPTION OF EMBODIMENTS

Crash resilience is provided for a FAT file system without violating Windows compatibility.

In the operation and structure of an embodiment, called a TI-PFAT file system, the TI-PFAT file system maintains the Log of every file system operation in the reserved Clusters of the FAT file system on the storage media.

The FAT File system organizes the storage device as a group of linear clusters. A cluster is basic unit of data storage in FAT file system. The File Allocation Table stores the status of all available clusters of the device. The status of a cluster can be either allocated as part of file/directory data or free or reserved. And each entry of File Allocation Table includes a datum that indicates the status of corresponding cluster.

Figure 1:
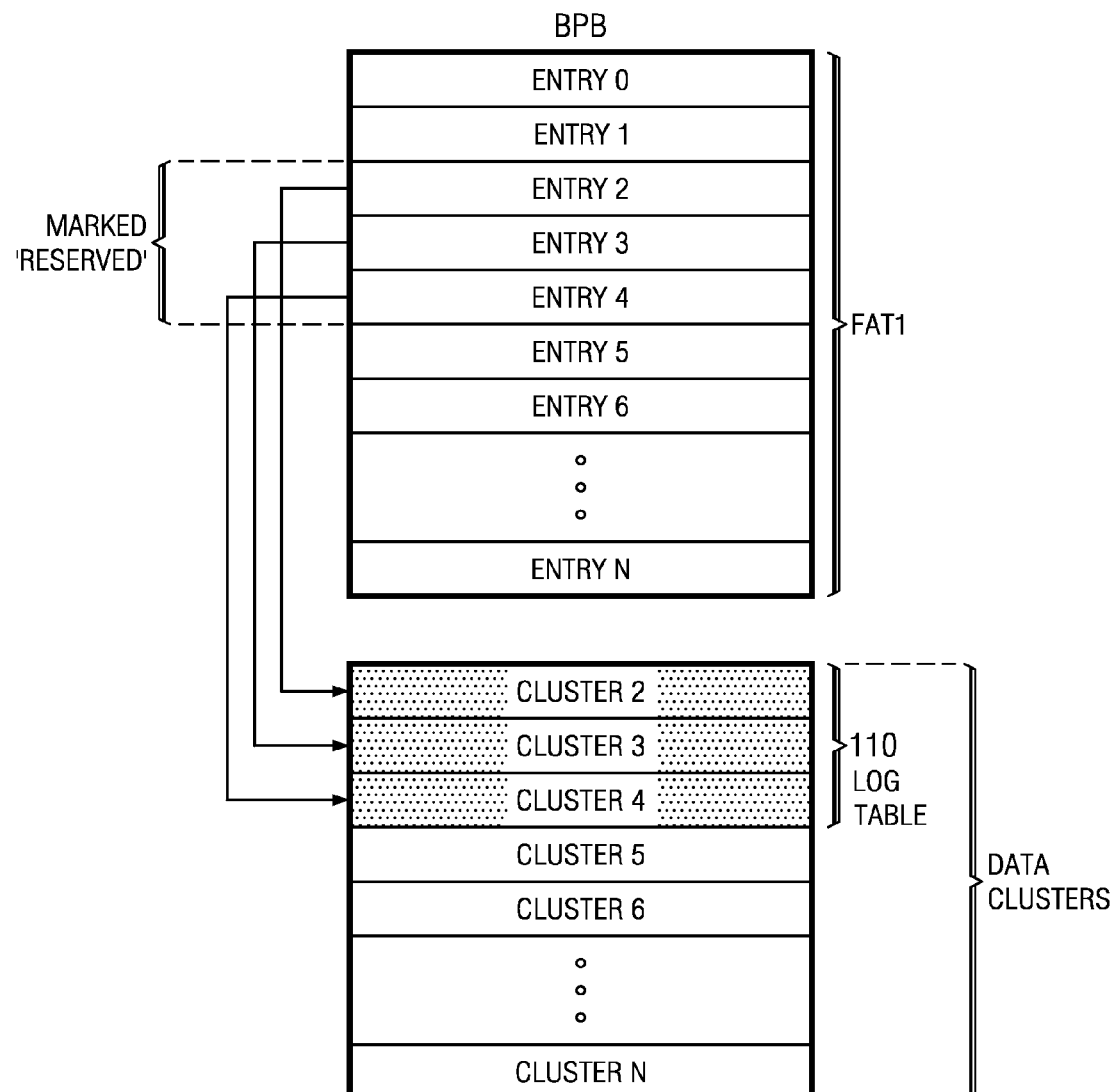
FIG. 1 is a data structure diagram of an inventive file system involving FAT with reserved clusters.

In FIG. 1, the TI-PFAT file system reserves and writes a group of FAT entries, which are marked as reserved and stored to have a reserved status for FAT file system purposes. This group of reserved clusters used to log the file system operations is called a Log Table 110. The structure of the FAT file system with the Log Table 110 in reserved sectors is shown in FIG. 1.

Conventionally, a FAT file system supports two File Allocation Tables named FAT1 and FAT2. Instead, the TI-PFAT file system of FIG. 1 uses only FAT1 to minimize the number of writes to FAT and thus reduces the performance degradations by the log write operations. A storage device with a FAT file system that is formatted with only one File Allocation Table is recognized as valid removable media by Windows PC. A BIOS parameter block BPB is also shown in FIG. 1.

In TI-PFAT, whenever the user so desires, the logging mechanism is switched OFF or ON. This feature has a low-battery mode in some embodiments (FIG. 5) that enables operation so that, in a mobile phone the file system can automatically switch on the logging mechanism when the battery power becomes degraded or falls below a specified threshold value of percentage charge or voltage level. Conversely, the TI-PFAT file system in the low-battery mode disables the logging when the phone battery is completely or more fully charged.

Figure 2:
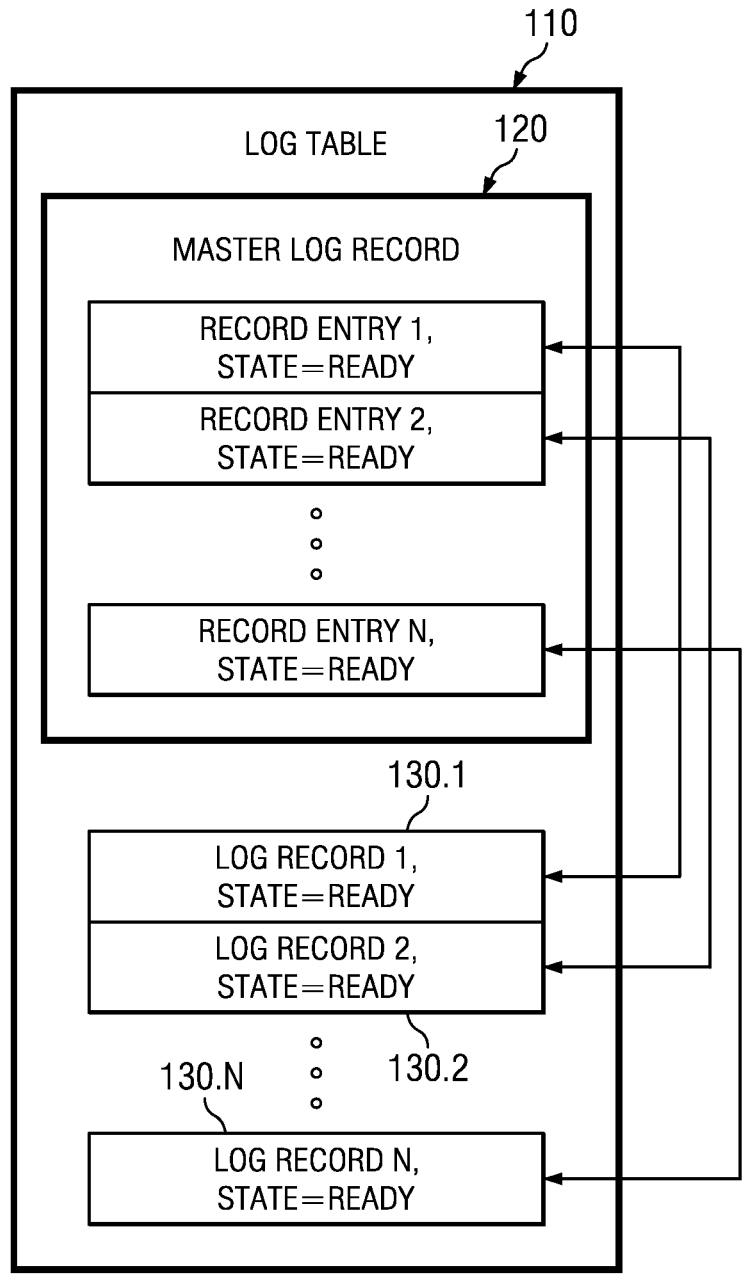
FIG. 2 is a data structure diagram of an inventive file system including a Log Table with a Master Log Record (MLR) and individual Log Records.

In FIG. 2, a Master Log Record 120 and individual Log Records 130.1, .2, . . . N for TI-PFAT are depicted. TI-PFAT file system operations include file/directory creation, write, rename and remove operations that update the file system Meta data. For example, the write operation, on a file, updates the FAT table entry and file size which is a part of the directory entry structure of the file. Directory or File creation establishes the name of the directory or file, specifies its location in storage such as hard disk or memory, identifies what directory, if any, is next-higher in the tree structure, and provides any other appropriate creation data. Whenever the file system operation creates or updates the Meta data of the file/directory, the new or updated Meta data information is first written or copied to a Log Table as structured information called a Log Record.

In FIG. 2, the Log Table contains multiple Log Records and a single Master Log Record (MLR). The MLR is contains the multiple entries where each entry is associated with a Log Record. Each entry in the MLR is called a Record Entry 1, 2, etc., and contains data describing the state of the associated Log Record 130.1, 130.2, etc., indicating whether the Log Record is committed or not. FIG. 2 depicts the Master Log Record MLR 120 and Log Records 130.1, 130.2, etc., of the Log Table 110.

Figure 3:
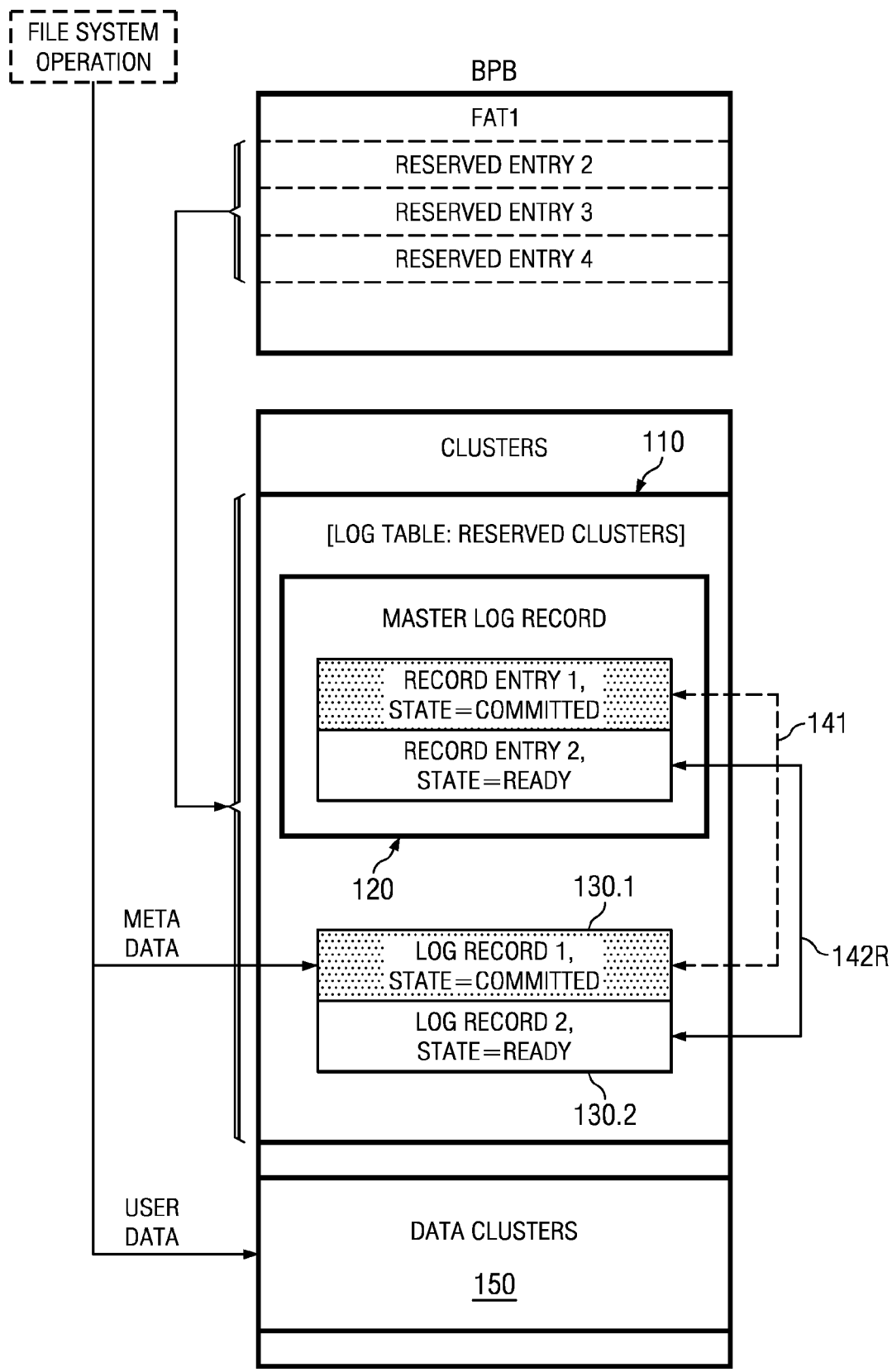
FIG. 3 is a process diagram of a Logging phase of the inventive file system operation.
Figure 4:
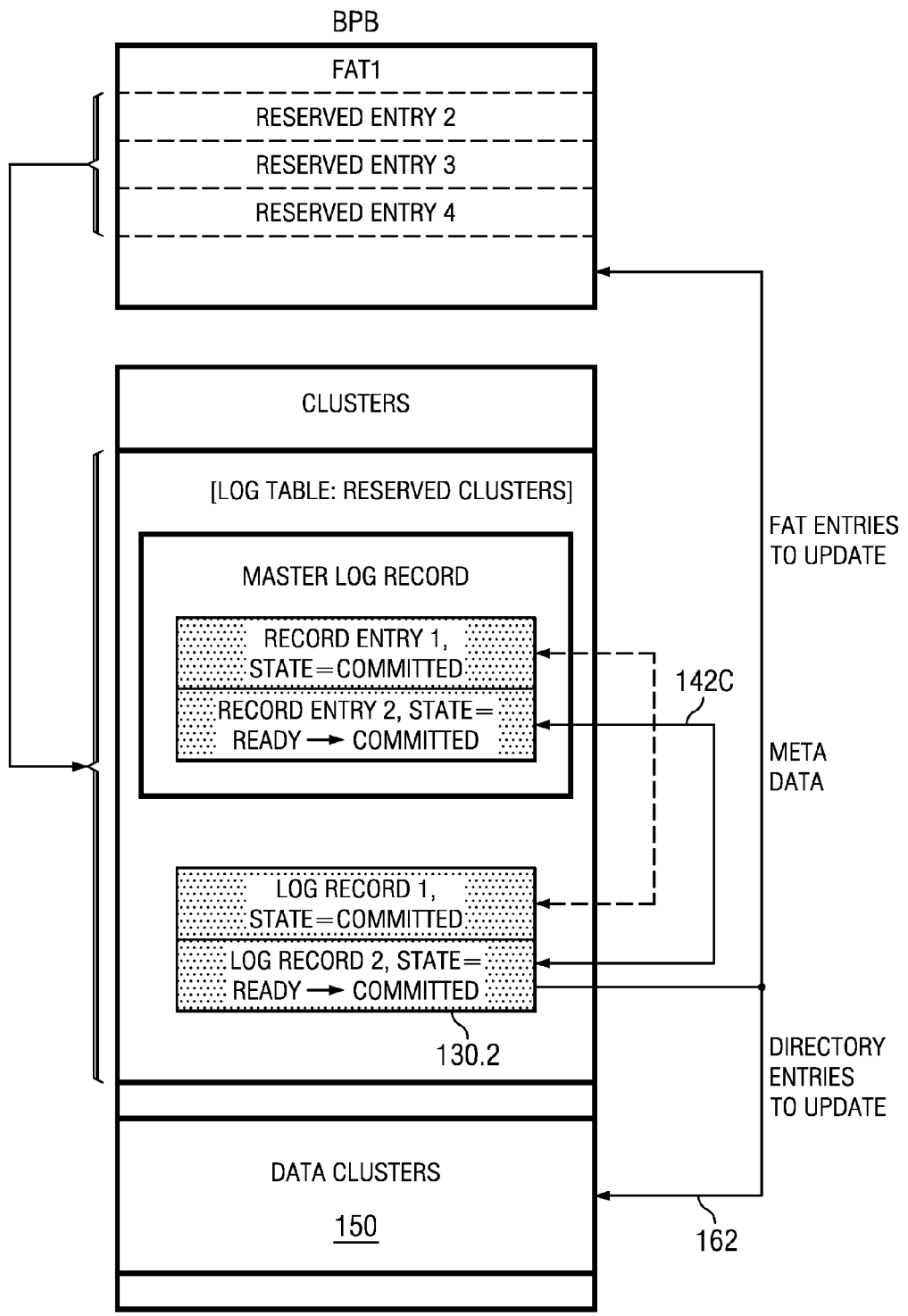
FIG. 4 is a process diagram of a Commit phase of the inventive file system operation.

Logging and Commit operations are included in various embodiments. In a TI-PFAT file system, a file system operation is composed of two phases. In FIG. 3, the first phase, called Logging, is illustrated. In FIG. 4, the second phase, called a Commit operation, is depicted.

Whenever Meta data of the file system is updated, a Log Record is created and written to Log Table in at least one reserved cluster. For one example, the MLR 120 is suitably created and written to a reserved cluster and updated therein, along with one or more Log Records 130.j entered in respective dynamically reserved additional reserved clusters. FIG. 3 shows Log record 1 and MLR record entry 1 are previously Committed as indicated by a dotted correspondence arrow 141. A cluster for a Log record 2 is reserved and the Meta data from a File system update operation goes to the Log Table as Log record 2. The state of the Log Record and the corresponding entry in the MLR are set as Ready, as indicated by a Ready correspondence arrow 142R, when the Log Record is written in the Log Table. The Ready entry represents readiness to write the Meta data to the file system elsewhere. This operation is a Logging operation as shown in FIG. 3. The MLR, in addition to holding state entries like Ready and Committed, in some implementations conveniently and compactly also holds identification and location information for the Log Records and their reserved clusters, since the file system may reserve clusters for other purposes that involve no Log Record. User data for a data file, for which Meta data is to be updated, goes to one or more Data clusters 150 in FIG. 3 that are given FAT1 Data (In-use) status and are not necessarily reserved.

Once the Log Record 130.2 is written to the Log Table 110 then the TI-PFAT file system Meta data is updated with the values contained in the Log Record 130.2, as indicated by outgoing arrows 162 from Log Record 130.2 in FIG. 4 to update FAT Meta data entries and to update Directory Meta data entries in or for one or more of the Data clusters 150 that are to have the User data shown in FIG. 3. Updating the file system Meta data with the values of Log Record is the Commit operation and is shown in FIG. 4. After the Commit operation is executed, the state of the Log Record and the corresponding entry in the MLR are set as committed in addition to or instead of Ready, as indicated by committed correspondence arrow 142C.

Crash Recovery

Figure 5A:
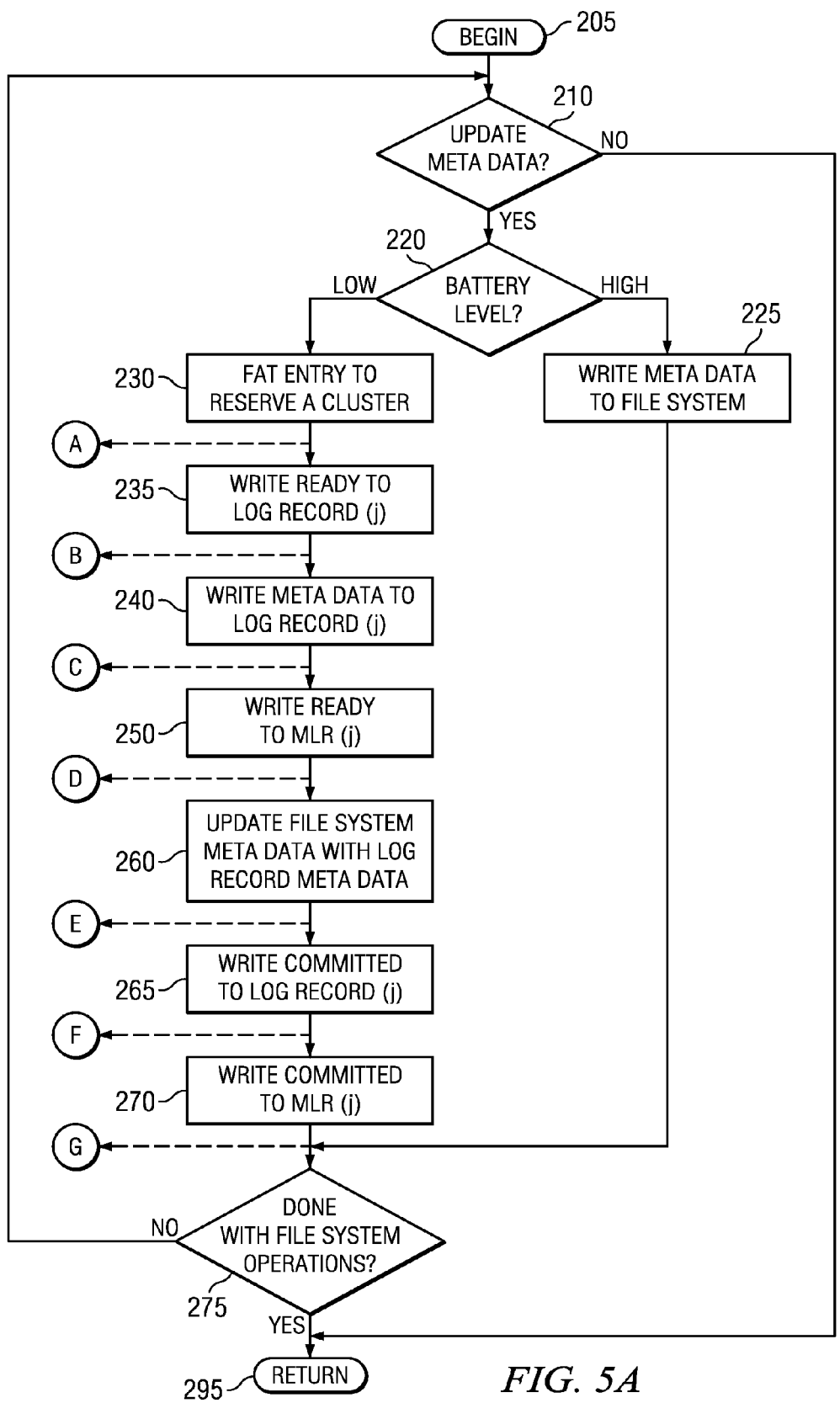
FIG. 5A is a flow diagram of an inventive process based on FIGS. 3 and 4 and showing power-fail scenarios too.
Figure 5B:
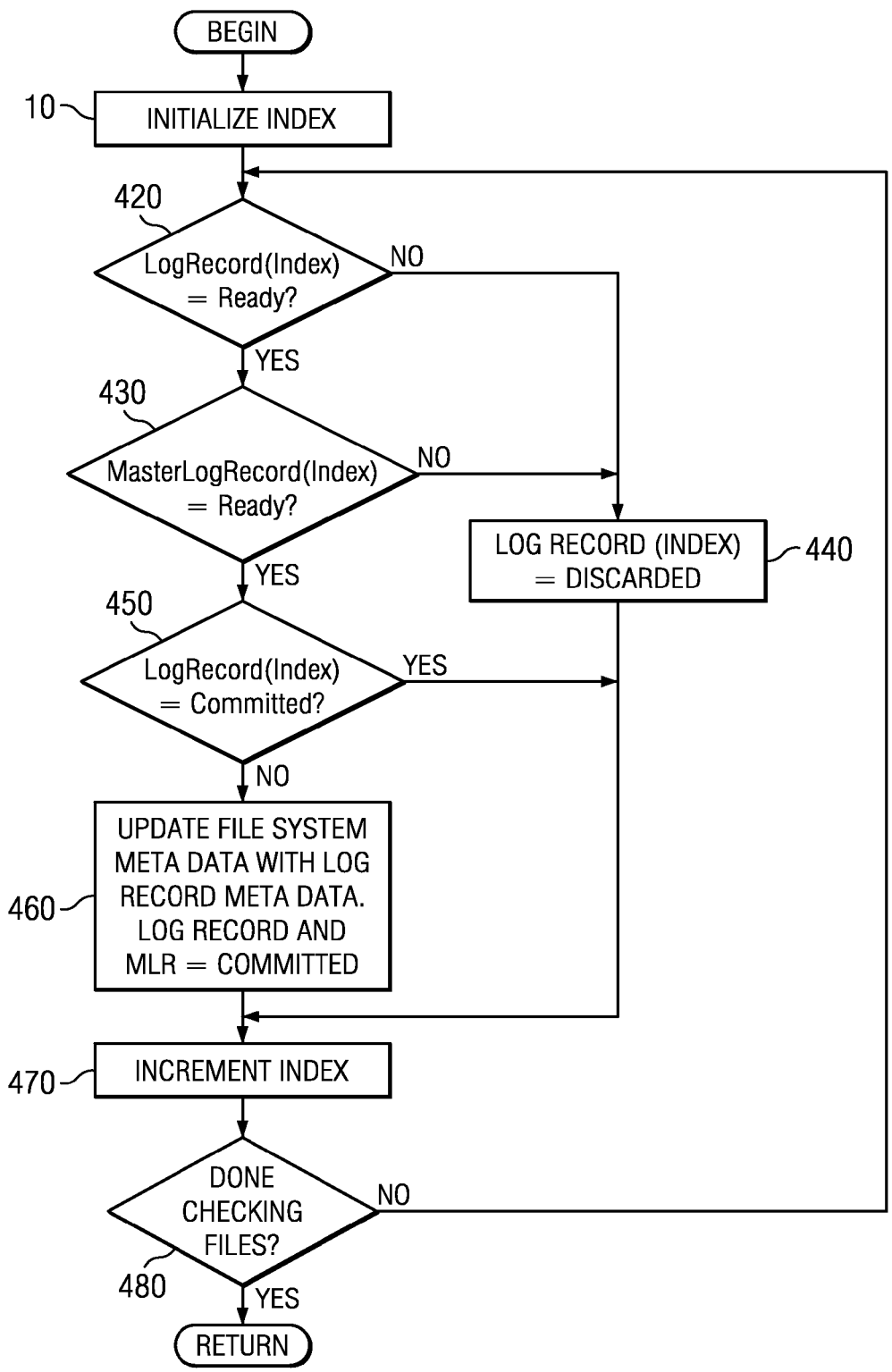
FIG. 5B is a process flow diagram of an inventive maintenance routine for re-boot or re-connection showing operations handling the power-fail scenarios of FIG. 5A.

In FIGS. 1-4 and 5A, if a power failure occurs before or during a Logging operation, then Log Record information is lost and no change is made to file system when the system/embedded device reboots in FIG. 5B. Suppose power fails after a Logging operation and the system reboots. Then the Commit operation is performed on each Log Record that has the Ready state provided that the associated or corresponding record entry of the MLR is in the Ready state. After the Commit operation the state of the Log Record and the corresponding log entry of the MLR are set to Committed. During system boot, if the state of any Log Record is Ready, but the state of the corresponding record entry of MLR is not Ready, then such Log Record should not be committed, and is not committed to the TI-PFAT file system. Instead, the state of the Log Record is set to Discarded to retain valid Meta data of the TI-PFAT file system that was earlier-stored from a Log Record to the file system by a step 260 or 460 to the file system at a location elsewhere in memory as discussed further herein.

Described in more detail, in FIG. 5A operations commence with a BEGIN 205 and determine in a decision step 210 whether Meta data are to be updated. If not (No) at step 210, operations branch to a RETURN 295. If so (Yes) at step 210, operations proceed to a special Battery mode decision step 220 and determine whether Battery level is High or not. If High, operations in a Battery-high mode proceed to a step 225 that writes Meta data to the File System to create, add, remove, rename or otherwise revise the directory and file structure of the file system. If Battery level is low at step 220, operations instead go to a Battery-low mode series of steps 230-270. In this way, a dynamic power management process especially benefits a battery-powered file system because the low-battery mode enables file system operation to automatically activate crash-resilient logging when the battery is low, and disables the logging when the battery is more fully-charged so that the battery is less likely to get low or will take longer to get low. After step 225 or 270, operations reach a decision step 275 that goes to a RETURN 295 if operations are Done (Yes). In some embodiments, more than one cluster may be reserved and serviced, in which case a loop branches back from step 275 (No) to step 210 and continues through step 275 until operations are Done, whence RETURN 295 is reached. In a battery-powered device, numerous file system operations of FIG. 5A over time are smartly power-managed so that battery energy is saved.

In FIG. 5A, step 230 makes a File Allocation Table entry that reserves a cluster to be used as a Log Record. Note that TI-PFAT is different in a number of ways, one of which is with respect to the location where the file system operation's logs are stored. The TI-PFAT implementation stores the logging information in reserved clusters and not unreserved data clusters, nor even in reserved sectors. The Reserved Clusters of the FAT file system are used by TI-PFAT for Logging file system update operations. Thus, TI-PFAT Logs are stored in the Reserved Clusters of FAT file system.

The TI-PFAT file allocation table system prevents loss and incorrect update of Meta data of the FAT file system due to uncontrolled power failures. The TI-PFAT file system is provided with only one File Allocation Table to ensure Windows compatibility. The Data written to the reserved clusters are hidden. Hence, the Windows operating system concludes that the file system log data are not modifiable by the user when the device is connected to the Windows PC. In TI-PFAT, the Logs are maintained in the reserved clusters of the FAT. Hence, the Logs are not, or will not be, visible to the user and thus are not user-modifiable when the device is connected to Windows PC or more generally to a processor having any operating system that prevents clusters specified in a particular way, called by whatever name equivalent to the designation "reserved" herein, from being modifiable by a user of the processor. In TI-PFAT all write operations including root directory are Log-based and hence are transaction safe. In TI-PFAT, existing free clusters are dynamically allocated as reserved clusters to store the Logs of file system operations. Clusters are portions of some memory space that are capable of such allocation on-the-fly at run-time so that the memory space for reserved, free and data (in-use, unreserved) usage can be dynamically increased, re-allocated, or decreased by structures and processes such as those described herein.

In TI-PFAT in FIG. 5A, the Log Records are written into reserved clusters in steps 235 and 240. Hence, Logged information 130.$j$ is not visible to user when the device is connected to Windows PC, and thus prevents the unintentional erase of the Log Records logging mechanism. TI-PFAT is enabled by step 220 when the battery power is low and is disabled when the phone battery is more fully charged or completely charged.

Step 220 in some embodiments has one threshold wherein Battery level is regarded as High for purposes of step 220 until Battery level falls below the threshold, and then Battery level is Low for purposes of step 220 until Battery level increases above the threshold again whereupon Battery level is High for purposes of step 220. In some other embodiments, Step 220 has hysteresis in the sense of two thresholds instead. In such embodiments, if Battery level is regarded as High for purposes of step 220 it continues to be regarded as High until Battery level falls below a Low threshold, whereupon Battery level is Low for purposes of step 220 until Battery level increases above a High threshold that is higher than that Low threshold whereupon Battery level is High for purposes of step 220. For battery levels between the thresholds, the decision made in step 220 depends on whether the battery level was most recently higher than the High threshold or was most recently lower than the Low threshold.

In FIG. 5A, TI-PFAT splits a file system operation into two phases, a Logging operation (steps 235, 240, 250) and a Commit operation (steps 260, 265, 270), and maintains Meta data consistency in case of power failure. Power failure in either a battery-powered system or an AC line-powered system might occur at any time, as represented by dotted arrows branching away from various of the pertinent steps 230-270, and labeled with circled points (A), (B), (C), (D), (E), (F), (G). A few clusters are marked as reserved in File Allocation Table FAT1, and logs are stored in the data area of the clusters. Removal of FAT2 (2nd File Allocation Table) enables implementing power fail safe features without sacrificing performance. In other words, power fail safe features in some embodiments provide high performance with FAT1 alone, and even without providing any FAT2. TI-PFAT uses reserved clusters 130.$j$ to store the Logs, thus maintaining compatibility with Windows operating systems, for instance.

In Logging & Commit operation, for any file system update operation, a Log Record is created with the updated Meta data in a step 240 and written to Log Table. While writing the Log Record, the state of the Log Record is set to Ready in step 235 by applying the Logging operation. A confirming Ready entry is written by step 250 to a corresponding Record Entry j in the Master Log Record 120.

In this way, the Log Record 130.$j$ holds Meta data on-deck, in readiness and in reserve as confirmed by the MLR Ready entry j in case a subsequent step 260 write of the Meta data from the Log Record 130.$j$ to the file system elsewhere becomes interrupted before completion. Put another way, if such interruption were to occur, the Meta data in the Log Record 130.$j$ remains ready for a re-writing or repair operation (see FIG. 5B step 460) because the Log Record is stored in a non-volatile store. Some embodiments have the Logging operation set the state of a single bit in the Log Record 130.$j$ to Ready in step 235 before writing the Meta data to the Log Record 130.$j$ in step 240, and set a corresponding single bit in the Record Entry j in the MLR to Ready in step 250 after writing the Meta data to the Log Record in step 240. This approach saves bits while minimizing single-bit errors and facilitates verification by more specifically identifying where in the operational sequence a power failure or interruption occurred.

Once the Log Record 130.$j$ has been written, the file system Meta data is updated by a step 260 with the values contained in the Log Record 130.$j$. The Log Record 130.$j$ state is then changed by a step 265 to Committed according to the Commit operation. A confirming Committed entry is written by step 270 to the corresponding Record Entry j in the Master Log Record 120.

Recovery from power failure, either from disconnection of a removable media device or from power loss in a device or system, is successfully executed by TI-PFAT as is evident by comparing FIG. 5A with FIG. 5B. Notice that the operations in FIG. 5B can be a routine that is part of a boot routine for use when a device that is making directory/file modifications boots or reboots. Also, the routine of FIG. 5B is suitably operated as a maintenance routine when connecting or re-connecting a removable media device, so that pending directory/file modifications are either discarded or completed depending on the state entries. The routine processes the state entries depending on ready, committed, and lack thereof and executes a response thereto.

In FIG. 5B, boot, re-boot, connection or re-connection maintenance operations commence at a BEGIN and proceed to initialize a loop Index that points to any given cluster for a loop over the reserved clusters in which Log Records are stored. If the power failure occurs at points (A), (B), or (C) of FIG. 5A before or during Logging operation, then FIG. 5B decision step 420 or 430 indicates for a given Log Record (Index) that Ready is not set (No) in either the Log Record (Index) or not confirmingly set in the Record Entry (Index) in the Master Log Record 120. The decision step 420 determines if the state entry in the Log Record lacks ready and lacks committed, and in that case step 440 writes a state datum for such a Log Record 130.$j$ substantially representing a state of at least some of the Meta data therein as Discarded (invalid). The decision step 430 determines if a corresponding (or second) state entry in the Record Entry j in MLR 120 lacks ready and lacks committed, and in that case step 440 writes a state datum for such a Log Record substantially representing a state of at least some of the Meta data as Discarded (invalid). Log Record information is lost and/or regarded as invalid and so no change is made to the file system in the sense that file system Meta data earlier stored elsewhere in non-volatile storage such as non-volatile memory or disk remains stored correctly in the same way as it was. In FIG. 5B the step 440 sets Log Record(Index) to Discarded and can set Record Entry (Index) likewise in MLR 120. At step 440, the processor can also be operated to actually discard Meta data itself to which the state entry Discarded pertains or even discard the entire Log Record and free the Record Entry in the MLR. In case of a discarded Log Record, the reserved cluster can be recycled such as by log-record erase and/or MLR Record Entry reset, as well as marking the cluster as free in FAT1 if that reserved cluster has no other contents besides the Log Record.

If power failure instead occurs at any of points (D), (E), (F) or (G) in FIG. 5A after the Logging completes, information in the logs is regarded as valid. Reboot operations in FIG. 5B proceed from step 430 (Yes) to a decision step 450 to determine whether the Record Entry (Index) is set to Committed. If not (No at step 430), power failure in FIG. 5A evidently occurred on or after point (D) and before point (F). Accordingly, a step 460 in FIG. 5B is executed and used to restore the file system by updating or overwriting the File System Meta data with the Meta data from LogRecord(Index), and entering Committed in LogRecord(Index) and Record Entry (Index) of the MLR 120. In other words, if a power failure occurs after completion of the Logging operation and before completion of the Commit operation, then on a subsequent reboot that log record is used to perform and complete the Commit operation. Thus, for instance, step 460 on reboot in FIG. 5B does what steps 260, 265, 270 would have done in FIG. 5A if the power failure had not occurred.

If a power failure instead occurs after the Commit operation so that point (G) is reached in FIG. 5A, then later re-boot step 450 determines Yes, that LogRecord(Index)=Committed. Given Yes at step 450, the Meta data in the Log Record and the corresponding Meta data stored by step 260 elsewhere in the file system corresponding to that Log Record, are retained as Committed.

In FIG. 5B, after any of steps 440, 450 (Yes), or step 460, operations reach a step 470 that increments the loop Index. A step 480 determines whether file checking is done, e.g., in the sense that all the cluster indices having Log Records have been accessed. If not, operations branch back to step 420 and continue the loop. Otherwise, loop operations are complete and operations go from step 480 (Yes) to a RETURN where further boot operations are performed or operations proceed to run-time.

Note that the loop of FIG. 5B loops through all the cluster indices having Log Records and accesses the Log Records 130 and MLR 120. In this way, if power failure happens when a Log Record is not fully Ready/Ready, then Meta data consistency is achieved on reboot by any suitable form of invalidation such as setting a Discarded entry or executing discarding. Furthermore, if power failure happens when a Log Record is Ready/Ready, but not fully Committed, then not only Meta data consistency but also some repair or restoration of the file system are also achieved on reboot by performing and completing the Commit operation that was not complete when the power-fail occurred. In this way, dynamic and robust power-fail-safe operations are achieved.

In the Battery-high mode of step 220, notice that a Log Record is not reserved nor written in this FIG. 5A example. Meta data at that time is written to the file system and not to a Log Record by step 225. Then suppose power failure occurs subsequently elsewhere in system software generally or perhaps pertaining to some other TI-PFAT file when the Battery mode is Low. On reboot, in FIG. 5B, such Meta data that was written to the file system in Battery-high mode is neither discarded nor updated; and such Meta data remains undisturbed and is retained because no LogRecord(Index) pertains to that Meta data for the FIG. 5B reboot operations to affect.

Some embodiments on reboot, or at some other time during system maintenance operations, check for Log Records that are Committed, such as represented by Committed/Committed in the Log_Record and the Record Entry in the MLR. In such case, the Log Record has performed its function and can be deleted and freed for other uses. Notice that freeing a Log Record is distinct from discarding it, since the Meta data that was earlier written in step 260 to the file system elsewhere in memory is not discarded nor signified as invalid. Likewise, the Record Entry in the MLR is freed for use when some other Log Record is created. In this way, TI-PFAT efficiently uses, maintains, and recycles memory spaces as well.

TI-PFAT is well suited for storage devices such as persistent flash memories like NOR flash memories and NAND flash memories. Moreover, TI-PFAT is suitable for supporting removable media such as MMC (MultiMediaCard), SD (Secure Digital), and T flash (Transflash, microSD) cards; and hard disks, memory stick devices and many more. TI-PFAT introduces negligible or no additional cost overhead due to new hardware. Dynamic Logging space allocation is provided by TI-PFAT. Performance time $P_t$ is very satisfactory and is the sum of the Log time $P_t$ plus Commit time $C_t$ as expressed by Equation (1):

$$P_t = L_t + C_t \qquad (1)$$

Figure 6:
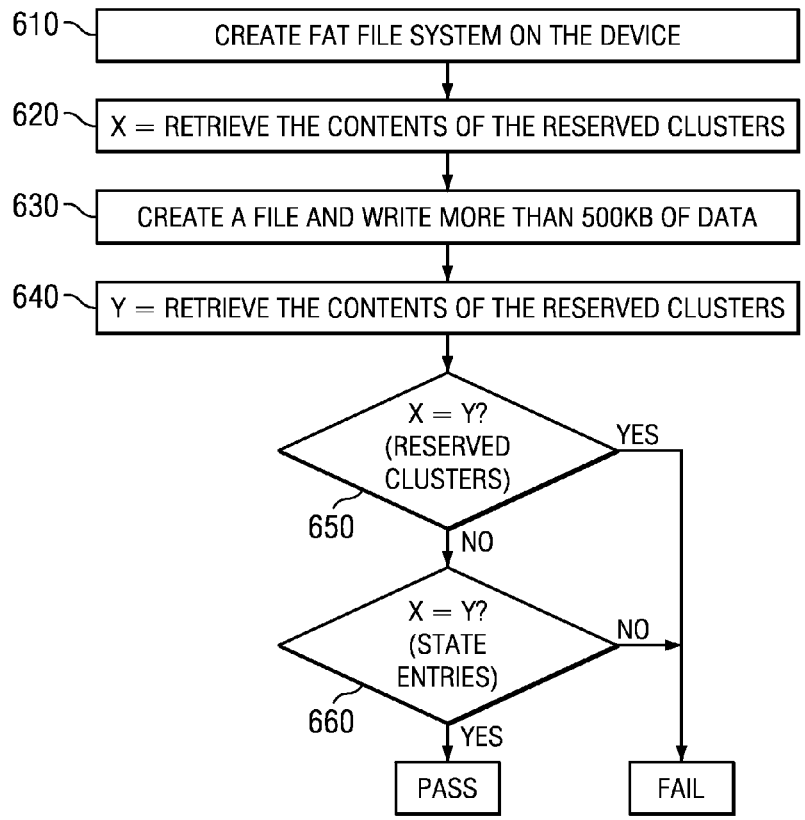
FIG. 6 is a flow diagram of an inventive testing process for detecting and confirming operations of an inventive file system of the other Figures.

In FIG. 6, a testing process is shown. In a first step 610, the embedded device such as removable memory or a cell phone with a FAT-based file system created on the device is provided for testing. In a second step 620, the contents of the reserved clusters are retrieved. These contents are designated as a test file X. A succeeding testing step 630 creates a file and writes more than, e.g., 500 KB of data. In TI-PFAT, doing so creates Log Table with MLR and Log Records with state entries that respectively match each other for a state entry in the MLR and state entry in the corresponding one of the Log Records. In a following step 640, the contents of the resulting reserved clusters thus written using the FAT-based file system are again retrieved in a similar manner, and these contents are designated as a test file Y. A decision step 650<X=Y?> compares the contents of each of the test files X and Y. If the clusters are different (No at 650) as regards number of reserved clusters or contents in at least one of them, then the operation is as expected of TI-PFAT and the test passes to a further test of state entries. If the clusters are not different (Yes at 650), then the operation is not as expected of TI-PFAT and the test does not pass. A further decision step 660 compares the state entry contents of each of the test files X and Y. If the contents of test files X and Y are the same as regards each state entry in the MLR and the state entry in the corresponding one of the Log Records that should match (Yes at 660), then the operation is as expected of TI-PFAT and the test passes. If they are different (No at 660), then the operation is not as expected of TI-PFAT and the test does not pass. Additional tests involving the Logging and Commit operations under various power-fail scenarios as described herein are also suitably provided. At this point the testing process is completed as to a given device and goes on to another embedded device to perform the test process. The test process is also suitably part of a manufacturing process that fabricates integrated circuits or assembles mobile embedded devices.

One example of an embodiment would be a cell phone modem with an OMAP® applications processor, an MMC-plus 512 MB size card storage device, a FAT32 type of file system with FAT sector size 512 bytes and FAT cluster size of 4K (8 sectors=8*512=4096 Bytes) and/or as taught herein.

FIGS. 7A-10 show various electronic systems that can also act as storage devices with or without a processor therein. At least one nonvolatile storage such as ROM, or NOR-flash or NAND-flash memory, hard disk, optical disk, or a non-volatile RAM such as ferro-electric RAM holds instructions for a boot routine and for an operating system such as an HLOS. A non-volatile memory that can be part of the storage or a separate memory is advantageously operated according to the TI-PFAT file system to hold files and meta data and at least one log record having meta data and a state entry. A processor such as a main microprocessor, or a modem or an applications processor is coupled to the storage and the memory. One or more such processor executes the boot routine as in FIG. 5B for boot and reboot, runs the HLOS and RTOS if any, and runs and constitutes the file system using and/or including the protective power-fail-safe operations of FIG. 5A.

Figure 7A:
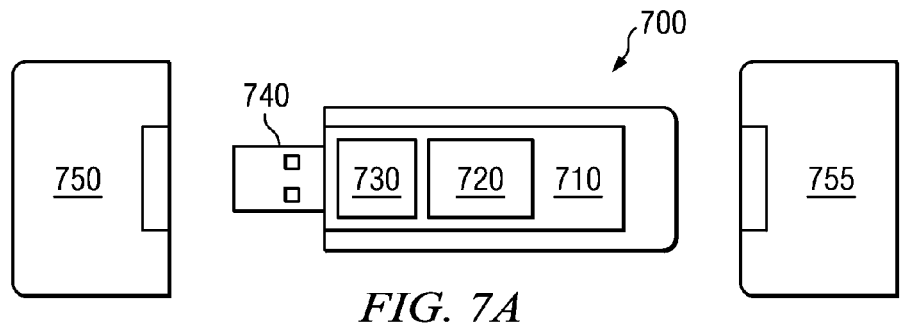
FIG. 7A is a block diagram of an inventive removable storage device with an inventive power fail safe file system to plug into one or more inventive computer devices running the inventive processes of FIGS. 5A and 5B.

In FIG. 7A, a flash memory drive 700 has a miniature printed circuit board 710 holding a flash memory integrated circuit 720 and a serial interface circuit 730 coupled to a serial connector (e.g., USB) 740. An enclosure or housing provides physical support for the printed circuit board 710 and the serial connector 740. A male connector is shown for one example in FIG. 7A without limitation. For instance, a mobile device may have a female connector and act as removable media relative to another device 750 coupled and plugged thereto. Device 750 for instance has a microprocessor and a storage coupled to the microprocessor and having physical representations of instructions so that the processor is operable to reserve at least one cluster in flash memory drive 700 and to create a Log Record as in FIGS. 1-4 when meta data for the file system is to be updated by a write of such meta data beforehand to such a reserved cluster, and otherwise to implement the TI-PFAT operations by device 750 of the processes of FIGS. 5A and 5B.

Wired or wireless coupling between first and second devices is provided in various embodiments and protected from power failure occurring in either device according to the structures and processes herein. For example, if it is desired that either device be used with other devices, then the log table is suitably stored in the device that has the directory/file structure that is being updated. Then a third device coupled to the device with the Log Table readily uses TI-PFAT to respond to the state entries in the Log Table and maintain/restore the file system in the second device. If the device has no power source of its own, then its directory/file structure is maintained/restored upon connection or re-connection to a powered device.

Figure 7B:
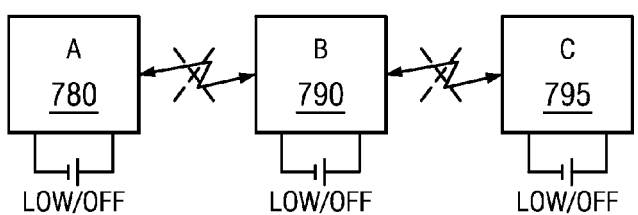
FIG. 7B is a block diagram of inventive computer devices running the inventive processes of FIGS. 5A and 5B and showing various scenarios.
Figure 7C:
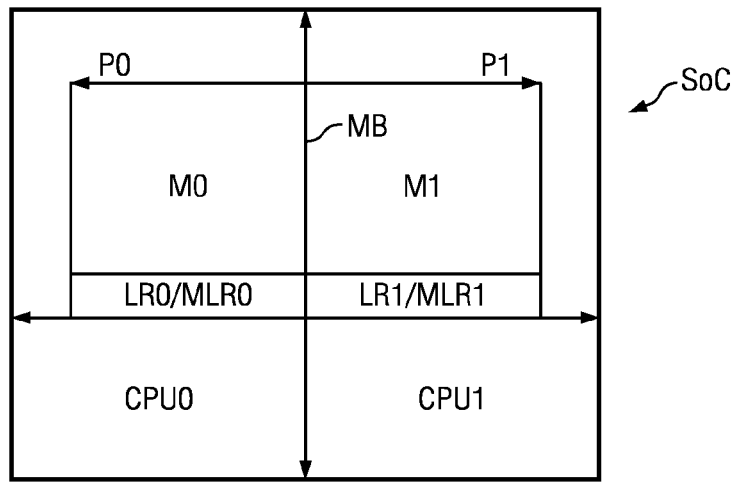
FIG. 7C is an integrated circuit layout diagram of an inventive system-on-chip SoC with inventive power domains and for use with the inventive processes of FIGS. 5A and 5B.

FIGS. 7A, 7B, and 7C non-exhaustively show some device types and scenarios that involve the following usage dimensions:
1) Power: Independent/Dependent
2) Data: Source/Destination
3) Form of Interruption: Power Loss/Disconnection without Power Loss
4) Site of Power Loss: Device A/Device B
5) Log Records Situs: Local/Dependent
6) FIG. 5B Situs: Local/Dependent
7) FIG. 5A Situs: Local/Dependent.
8) Concurrent Updates: None/Dependency In FIG. 7A, the removable device 700 is called Device B that is 1) Dependent for power on Device A (750) and 2) is the Destination for information that might be corrupted by power loss. If the power loss occurs by disconnection, then the FIG. 5B file structure maintain/restore process is executed on connection or re-connection. If the power loss occurs in Device A (750) without disconnection, then the FIG. 5B maintain/restore process is executed on re-boot. If Log Records Situs is Local to the removable device 700 then it can be connected to some device 755 having TI-PFAT other than device 750 and the file structure maintain/restore process is successfully executed powered by that other device 755. Moreover, if FIG. 5B Situs is Local to the removable device 700 then it can be connected to some device 755 other than device 750 whether or not the other device has TI-PFAT, and the FIG. 5B file structure maintain/restore process is successfully executed by removable device 700 powered by that other device 755. Further, if FIG. 5A Situs is Local to the removable device 700 then it can be connected to some device 755 other than device 750 whether or not the other device 755 has TI-PFAT, and the file structure is power-fail protected with operations in a Log Table while being updated by removable device 700 in response to creates/writes/re-names/deletes by that other device 755.

In FIG. 7B, a device 780 is called Device A and is 1) Independent in power relative to a Device B (790) and 2) can be either the Source or the Destination for information that might be corrupted by power loss. If the power loss occurs in Device B (790) by Disconnection without Power Loss in Device A (780), then the FIG. 5B file structure maintain/restore process is executed by Device A (780) on connection or re-connection, or indeed executed on Device B (790). In this way, Device B (790) maintains file Meta data consistency and repairs files to enhance its own operations and performance with a third Device C (795). If the power loss occurs in Device A (780) without disconnection, then the FIG. 5B maintain/restore process is executed on re-boot of Device A if Device A is a FIG. 5B situs, else FIG. 5B is executed by Device B if Device B is a FIG. 5B situs. Log Records Situs is desirably Local to each Device 780 or 790 that is a Destination, to increase its usefulness and performance when connected to Device C (795). Whichever Device A, B or C has Low Battery suitably runs FIG. 5A operations in Battery-low mode so that the FIG. 5A operations update a Log Table in the Device that is the Destination for that Meta data. Suppose FIG. 5A Situs is Local to the Device 790. Then if Device 790 is subsequently connected to Device C (795) whether or not Device C (795) has TI-PFAT, the file structure in Device B (790) can be power-fail protected with operations in a Log Table while being updated by Device 790 itself in response to creates/writes/re-names/deletes by Device C (795).

In FIG. 7C, a system on chip SoC integrated circuit has independently power-managed power domains for each of various processors, each of different memories, and each of a plurality of peripherals. The SoC includes power domains, for example, for each one of multi-core processor CPU cores CPU0 and CPU1 with their caches, read/write non-volatile memory including space allocable as reserved clusters for Log Tables LR0/MLR0 and LR1/MLR1 each as in FIGS. 1-4, static random access memory SRAM spaces M0 and M1, and peripherals P0 and P1. At least one system memory bus MB provides access of the various domains to each other. Power management receives an additional degree of freedom from TI-PFAT promoting file system consistency and protection in such system architecture wherein power modes and voltage and clock frequency can be established and altered at times that are responsive to levels of activity and use-demand in the power domains. For some background on power management, see U.S. Published Patent Application 2008-0307240 "Power Management Electronic Circuits, Systems, and Methods and Processes of Manufacture" dated Dec. 11, 2008 (TI-60478) incorporated herein by reference. Meta data writes by any powered one or more of CPU0, CPU1, P0 and P1 to a TI-PFAT file system supported by powered/active memory M0 beneficially are supported by Log Table LR0/MLR0. Meta data writes by any powered one or more of CPU0, CPU1, P0 and P1 to a TI-PFAT file system supported by powered/active memory M1 beneficially are supported by Log Table LR1/MLR1.

The power domain partitioning can be generalized to any number beyond the two illustrated in FIG. 7C. The Log Table for a power domain is powered managed in tandem with its power domain. In some SoC embodiments, a structure and process embodiment herein is implemented, for instance, so that a given power domain having memory in which file system Meta data can be stored has one or more directories allocated to that power domain and includes a read/write non-volatile Log Table for that power domain in at least one FAT-reserved cluster and the Log Table situated in at least one of those directories allocated to that power domain in the file system. In this way, the SoC with its power-removable power domains in FIG. 7C is organized in the file system hierarchy a manner analogous to the way physically-removable media devices 700 and system 750 ports for them in FIG. 7A can be managed by TI-PFAT.

Concurrent updates can involve Meta data dependency such as when a higher priority process interrupts a lower priority process to create or alter the meta data for the same file or directory. Also, the higher priority process may be re-naming a directory, and the lower priority process may be using the old name of that directory to position, create and insert a subdirectory under it in the directory/file tree. Since such cases of dependency can arise under a conventional FAT file system, the higher and lower priority processes can handle them the same way. Moreover, the TI-PFAT procedures of FIGS. 1-5B provide new flexibility so that such processes have additional visibility to Ready and Committed state entries at the time of an interrupt and can respond by further executing maintenance and repair of FIG. 5B or not as appropriate to enhance performance of each particular process and the overall system.

FIGS. 7A, 7B, 7C, FIGS. 8A, 8B, FIG. 9 and FIG. 10 each show examples of a device with a memory and including a file system as FIGS. 1-4. Log data are written to clusters in the device and specified as reserved to protect file system log data when a removable device is connected or disconnected, such as to/from a computer box or mobile device. Digital camera, camcorder, videophone, palmtop, media player and other mobile devices may present application-specific considerations. PC protection and protection of other devices herein includes any one or more of using reserved clusters for dynamic update and hiding log record and MLR from user applications, discarding a log record that lacks matching Ready states in the log record and the MLR, restoring file system data by performing and completing a Commit operation using a Ready/Ready fully-logged Log Record, and any other protection method to which the structures and processes described herein lend themselves.

A readable non-volatile storage holds physical representations of instructions for an HLOS, RTOS, and file system including instructions so that the processor is operable in accordance with the instructions as taught herein, e.g., for operations of FIGS. 5A and 5B, and various applications. In processor operation, the FAT and Log Table of FIGS. 1-4 are provided in a writeable and readable non-volatile storage and revised as well as shown in FIGS. 1-4 and arrows thereon. The physical representations can include magnetic alterations in a hard disk drive or in a magneto-resistive memory, electrical charges on floating gates of a flash memory or otherwise electrically in a non-volatile memory, optically responsive alterations in an optical disk, or other physical representations in any suitable structure so that the processor is operable in accordance with the instructions as taught herein. The storage can be magnetic, electrical, optical, or otherwise or combinations thereof. Thus, in an one type of embodiment of a system as manufactured, the non-volatile store might include an HLOS and file system with operations of FIGS. 5A and/or 5B, and various applications and a small Log Table or even no Log Table at all prior to user operation. Another type of embodiment, such as a removable flash drive, might have a Log Table as in FIG. 1 and no HLOS nor processor nor instructions for operations of FIGS. 5A and 5B. Still other embodiments can have combinations of all the foregoing. In general, the various sets of instructions are arranged with selected structures and partitioned in any manner that provides embodiments that contribute utility.

Various benefits and advantages of some embodiments such as TI-PFAT or other embodiments herein are nonexhaustively tabulated in TABLE 1.

TABLE 1

TI-PFAT Differentiation, Benefits and Advantages

| Area of Differentiation | Advantages | Why Advantage |
|---|---|---|
| Converting FAT into a Power FAIL Safe File System | Most phones today use two file systems - a power fail safe file system for storing critical phone data and a FAT file system for PC compatibility. TI-PFAT has only one file system in the phone or any embedded storage device. | Lowers the Cost of investment on different file systems. Memory Foot Print reduction lead to increased market penetration of low cost mobile segments Faster time to market while cutting down on development life cycle |
| Comprehensive Power Fail Safe System without compromising performance and suitable for both persistent and removable medias | Usable to support all memory devices. | No additional costs to implement power-fail safe mechanism for removable media. |

Figure 8A:
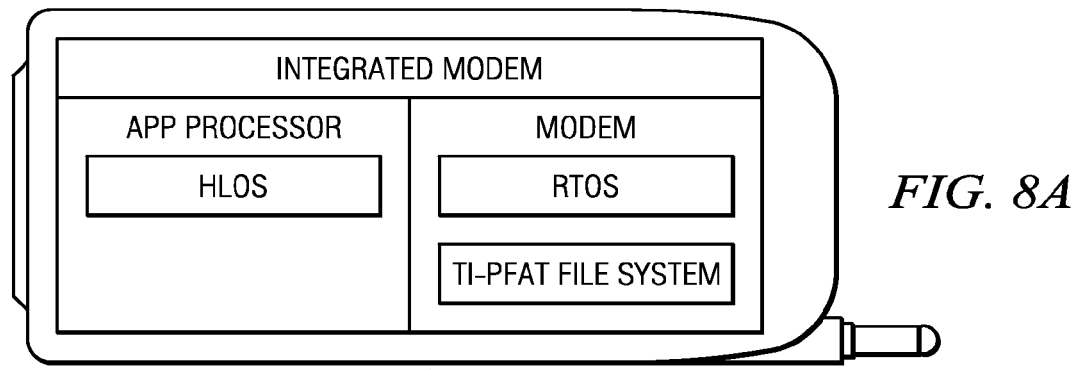
FIG. 8A is a partially pictorial, partially block diagram of an inventive handset smartphone with an inventive power fail safe TI-PFAT file system.
Figure 8B:
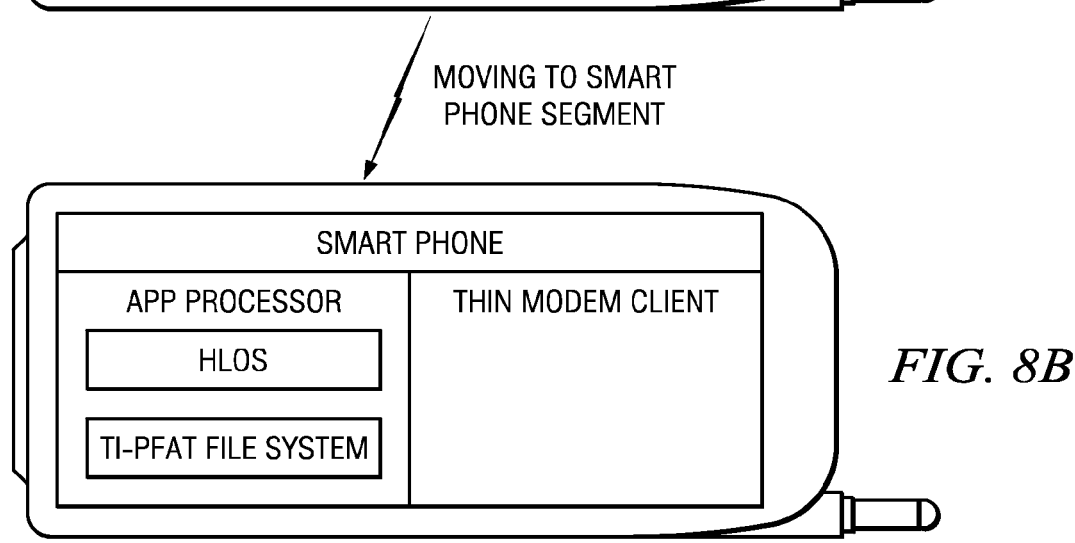
FIG. 8B is a partially pictorial, partially block diagram of an inventive handset smartphone with an inventive power fail safe TI-PFAT file system associated with the application processor.

FIGS. 8A and 8B illustrate different embodiments of a power-fail-safe file system coupled with both a modem and a processor to protect at least some data for the modem, and the processor operable to utilize that same file system.

In FIG. 8A, one system embodiment has a smartphone with an application processor and associated HLOS (high level operating system) such as Symbian or Linux or Windows or other HLOS, integrated with a modem having an RTOS (real time operating system) and TI-PFAT file system associated with the modem. A power fail safe TI-PFAT file system as described herein protects critical phone data on the Modem processor side. The application processor(s) is arranged to utilize the TI-PFAT file system for multimedia applications. The power fail safe operation of TI-PFAT and its other features as described herein is readily used to improve FAT-based file systems with resulting benefits and advantages of TI-PFAT.

In FIG. 8B, a second system embodiment has a smartphone with an application processor and associated HLOS such as Symbian or Linux or other HLOS and TI-PFAT file system associated with the application processor. The application processor is integrated with a modem operating as a thin client modem. This moves the file system overhead (power fail safe) to the application processor. In this way the power fail safe TI-PFAT file system as described herein protects critical phone data for the application processor and/or the thin client modem. The application processor(s) is arranged to utilize the TI-PFAT file system for multimedia applications. The power fail safe operation of TI-PFAT and its other features as described herein improve FAT-based file systems with resulting benefits and advantages of TI-PFAT.

Figure 9:
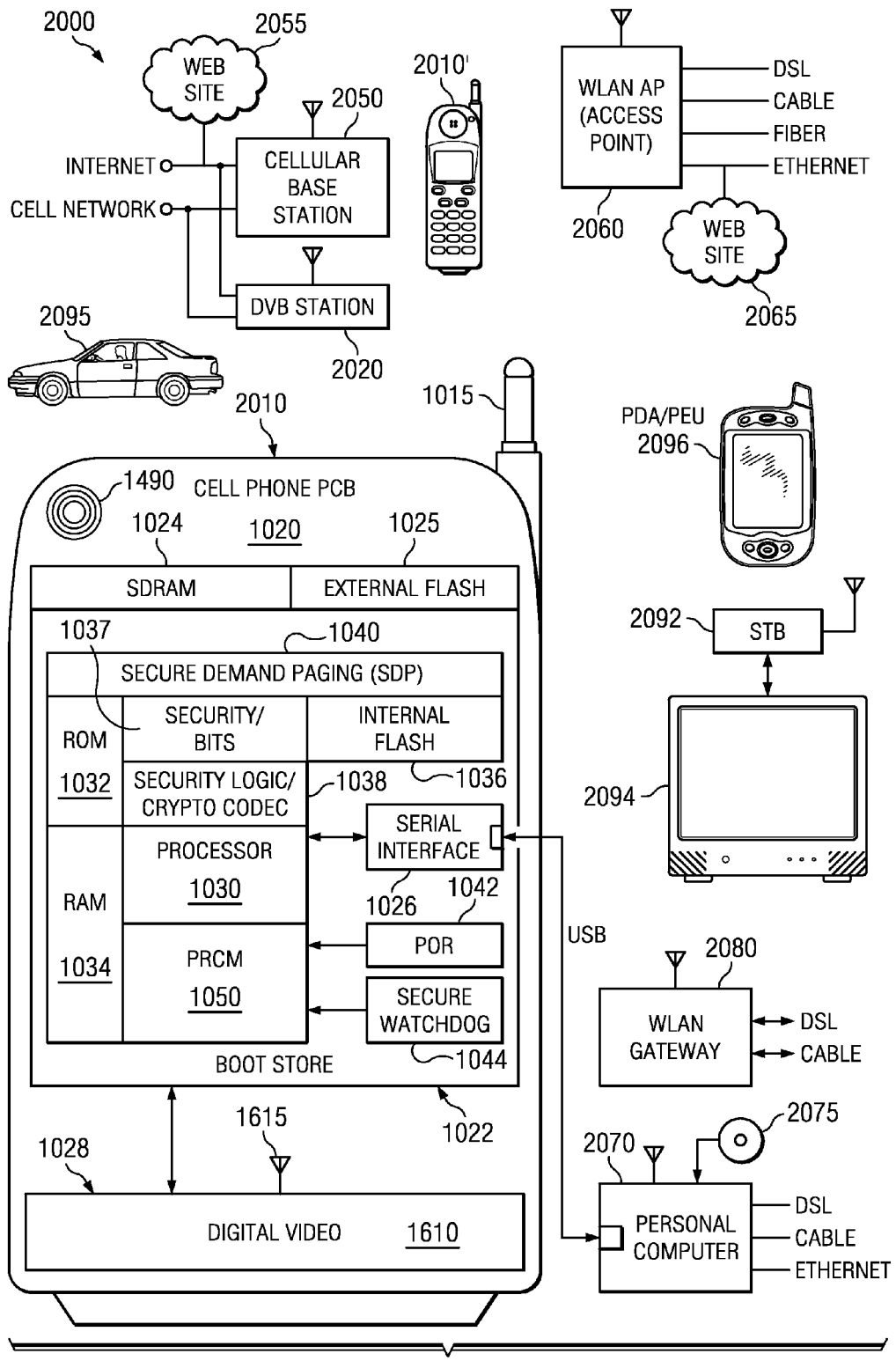
FIG. 9 is a block diagram of an improved communications system improved with any one, some or all of the inventive circuits and subsystems shown in various other Figures.

In FIG. 9, an improved communications system 2000 has system blocks as described next and improved with any one, some or all of the circuits and subsystems shown in various other Figures of the drawing. Any or all of the system blocks, such as cellular mobile telephone and data handsets 2010 and 2010', a cellular (telephony and data) base station 2050, a WLAN AP (wireless local area network access point, IEEE 802.11 or otherwise) 2060, a Voice over WLAN Gateway 2080 with user voice over packet telephone 2085 (not shown), and a voice enabled personal computer (PC) 2070 with another user voice over packet telephone (not shown), communicate with each other in communications system 2000.

Camera 1490 provides video pickup for cell phone 2010 to send over the internet to cell phone 2010', personal digital assistant/personal entertainment unit PDA/PEU 2096, TV 2094, automobile 2095 and to a monitor of personal computer PC 2070 via any one, some or all of cellular base station 2050, DVB station 2020, WLAN AP 2060, set top box STB 2092, and WLAN gateway 2080. Handset 2010 has a video storage and other storage, such as hard drive, flash drive, high density memory, and/or compact disk (CD) in the handset for digital video recording (DVR) such as for delayed reproduction, transcoding, and retransmission of video to other handsets and other destinations.

On a cell phone printed circuit board (PCB) 1020 in handset 2010, is provided a higher-security processor integrated circuit 1022, an external flash memory 1025 and SDRAM 1024, and a serial interface 1026. Handset 2010 provides one of numerous examples of a computer device that includes a processor 1030 and a storage 1025 coupled to the processor 1030 and having physical representations of instructions for a file system having clusters and meta data and operating as described in connection with the other Figures herein. A Power, Resets and Control Module PRCM 1050 (1185, 1470 of FIG. 10) is provided for smart power management. Serial interface 1026 is suitably a wireline interface, such as a USB interface connected by a USB line to the personal computer 2070 and magnetic and/or optical media 2075. Cell phone 2010 intercommunication also occurs via a cellular modem, WLAN, Bluetooth and/or otherwise and from a website 2055 or 2065, television and physical layer (PHY) or other circuitry 1028. Processor integrated circuit 1022 has MPU (or CPU) block 1030 coupled to an internal (on-chip read-only memory) ROM 1032, an internal RAM 1034, and flash memory 1036. A security logic circuit 1038 is coupled to secure-or-general-purpose-identification value (Security/GPI) bits 1037 of a non-volatile one-time alterable Production ID register or array of electronic fuses (E-Fuses). Depending on the Security/GPI bits, boot code residing in ROM 1032 responds differently to a Power-On Reset (POR) circuit 1042 and to a secure watchdog circuit 1044 coupled to processor 1030.

Figure 10:
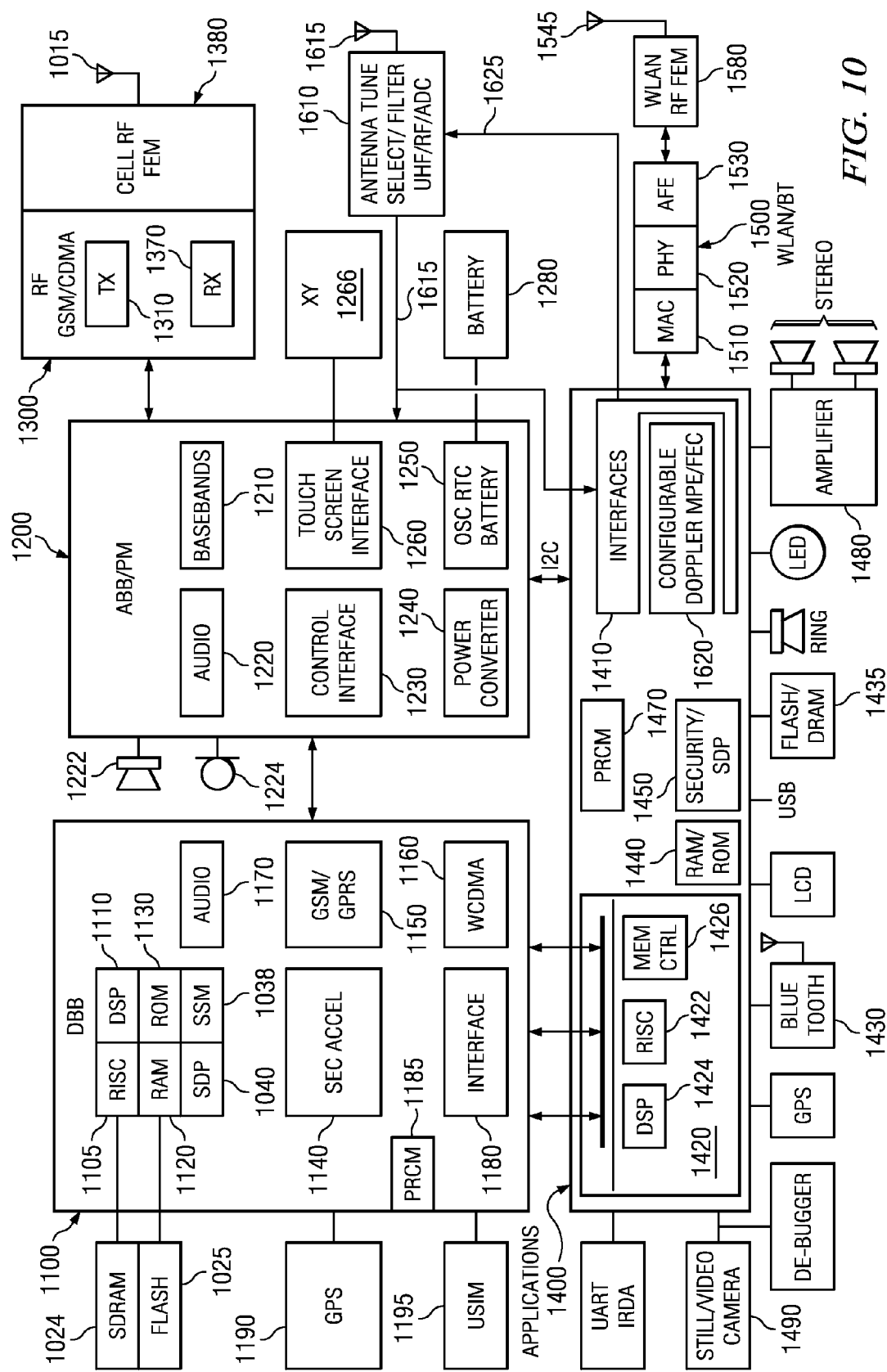
FIG. 10 is a block diagram of circuit blocks of an inventive cellular telephone handset system including the inventive file system of the other Figures.

In FIG. 10, handset 2010 has an integrated circuit 1100 that includes a digital baseband (DBB) block that has a RISC processor 1105 and a digital signal processor 1110, communications and security software, and security accelerators 1140. A memory controller interfaces the RISC core 1105 and the DSP core 1110 to Flash memory 1025 and SDRAM 1024. On chip RAM 1120 and on-chip ROM 1130 also are accessible to the processors 1105 and 1110 for providing sequences of software instructions and data thereto. A security logic circuit 1038 of FIGS. 9 and 10 has a secure state machine (SSM) to provide hardware monitoring of any tampering with security features. A Secure Demand Paging (SDP) circuit 1040 is provided for effectively-extended secure memory.

Digital circuitry 1150 on integrated circuit (IC) 1100 supports and provides wireless interfaces for any one or more of GSM, GPRS, EDGE, UMTS, and OFDMA/MIMO embodiments. Digital circuitry 1160 provides codec for CDMA (Code Division Multiple Access), CDMA2000, and/or WCDMA (wideband CDMA or UMTS) wireless suitably with HSDPA/HSUPA (High Speed Downlink Packet Access, High Speed Uplink Packet Access) (or 1xEV-DV, 1xEV-DO or 3xEV-DV) data feature via the analog baseband chip 1200 and RF GSM/CDMA chip 1300. Audio/voice block 1170 supports audio and speech/voice functions and interfacing. Speech/voice codec(s) and user voice-recognition/voice control are suitably provided in memory space in audio/voice block 1170 for processing by processor(s) 1110. Applications interface 1180 couples the digital baseband 1100 to applications processor 1400. Power resets and control module (PRCM) 1185 provides power management circuitry for integrated circuit (IC) chip 1100. IC chip 1100 is coupled to location-determining circuitry 1190 for GPS (Global Positioning System). IC 1100 is also coupled to a USIM (UMTS Subscriber Identity Module) 1195.

In FIG. 10, a mixed-signal integrated circuit 1200 includes an analog baseband (ABB) block 1210 for GSM/GPRS/EDGE/UMTS/HSDPA/HSUPA and an analogous ABB for CDMA wireless and any associated 1xEV-DV, 1xEV-DO or 3xEV-DV data and/or voice with its respective SPI (Serial Port Interface), digital-to-analog conversion DAC/ADC block, and RF Control pertaining to CDMA and coupled to RF (CDMA) chip 1300. An audio block 1220 has audio I/O (input/output) circuits to a speaker 1222, a microphone 1224, and headphones (not shown). A control interface 1230 has a primary host interface (I/F) and a secondary host interface to DBB-related integrated circuit 1100 for the respective GSM and CDMA paths.

A power conversion block 1240 includes buck voltage conversion circuitry for DC-to-DC conversion, and low-dropout (LDO) voltage regulators for power management/sleep mode of respective parts of the chip supplied with voltages VDDx regulated by the LDOs. Power conversion block 1240 provides information to and is responsive to a power control state machine between the power conversion block 1240 and circuits 1250 for clocking chip 1200. A touch screen interface 1260 is coupled to a touch screen XY 1266 off-chip for display and control. Battery 1280 provides power to the system and battery data to circuit 1250 on suitably provided lines from the battery pack. Power conversion block 1240 and other related circuits are thus subject to a power fail event in case of battery discharge or disconnection, and the file system and processes described herein are power-fail-safe and crash-resistant.

In FIG. 10 an RF integrated circuit 1300 includes a GSM/GPRS/EDGE/UMTS/CDMA/MIMO-OFDMA RF transmitter block 1310 fed by baseband block 1210 of chip 1200, and Transmitter 1310 drives a dual band RF cellular telecommunications RF front-end module 1380 coupled to one or more antennas 1015 (110, 120, 119 in FIG. 2). Antenna 1015 is coupled to PA(s) and LNA(s) (low noise amplifiers) as described elsewhere herein and depicted in FIGS. 2-8. The cellular telephone handset 2010 thus has any of user interface transducers 1222, 1224, 1266, other displays and other user interface transducers ultimately coupled to that plurality of electronic circuits of FIGS. 2-8. LNA(s) couples to GSM/GPRS/EDGE/UMTS/CDMA demodulator 1370 to produce I/Q (in-phase, quadrature outputs) to baseband block 1210. Replication of blocks and antennas is provided in a cost-efficient manner to support MIMO OFDMA embodiments.

Chip 1400 has an applications processing section 1420 RISC processor 1422 (such as MIPS® core(s), ARM® core(s), or other suitable processor), a digital signal processor 1424, and a shared memory controller MEM CTRL 1426 with DMA (direct memory access), and a 2D/3D graphic accelerator. See also FIGS. 8A and 8B. Speech/voice codec functionality is processed. Off-chip memory resources 1435 include DRAM and flash memory. Shared memory controller 1426 interfaces the RISC processor 1422 and the DSP 1424 via an on-chip bus to on-chip memory 1440 with RAM and ROM. Security logic 1038 of FIGS. 9 and 10 (1038, 1450) includes hardware-based protection circuitry, also called security monitoring logic or a secure state machine SSM to monitor busses and other parts for security violations. A JTAG serial scan emulation interface probes the pin boundary and internal circuitry of the integrated circuits and couples to an off-chip emulator Debugger. Also, I2C interfaces to analog baseband ABB chip 1200, and an interface couples to applications interface 1180.

DLP™ display technology from Texas Instruments Incorporated is coupled to interface 1410 or otherwise as convenient. A projector with DLP™ display technology in some embodiments also suitably includes a modem and/or application processor with file structure and Log Table resulting from software executing processes of TI-PFAT as taught herein either in the projector or remotely. A transparent organic semiconductor display is provided on one or more windows of a vehicle 2095 of FIG. 9 and wirelessly or wireline-couples to the video feed.

In FIG. 10, a WLAN and/or WiMax integrated circuit 1500 includes MAC (media access controller) 1510, PHY (physical layer) 1520 and AFE (analog front end) 1530. AFE 1530 is bidirectionally coupled for transmit and receive to fully-integrated WLAN RF front-end module or otherwise. A MIMO UWB (ultra wideband) MAC/PHY supports OFDM in 3-10 GHz. UWB bands. communications in some embodiments. A digital video integrated circuit 1610 provides television antenna 1615 tuning, antenna selection, filtering, and RF input stage for recovering video/audio/controls from DVB station 2020 of FIG. 22.

Any processor in FIG. 10 suitably executes TI-PFAT in any device or system of FIG. 9. Such TI-PFAT processor such as the RISC processor 1422 or DSP 1424 is provided in application processing chip 1400, or the RISC processor 1105 or DSP 1110 in digital baseband 1100, for instance. Still other system devices such as those depicted or described in connection with FIG. 9 are provided with the structures and controls of the other Figures herein.

Various embodiments are used with one or more microprocessors, each microprocessor having a pipeline is selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other microcontrol blocks using any one or more of the foregoing.

ASPECTS (See Notes paragraph at end of this Aspects section.)

5A. The electronic system claimed in claim 5 wherein the routine is part of a boot routine.

5B. The electronic system claimed in claim 5 wherein said part of said storage is removable and the routine is operable on re-connection of the removable part.

13A. The electronic system claimed in claim 13 wherein, if a log record has a state entry substantially representing committed, the response leaves meta data already stored elsewhere as a result of the commit undisturbed.

15A. The storage device claimed in claim 15 wherein the status has alternatives that substantially represent a cluster as free, in use, and reserved.

17A. The storage device claimed in claim 17 wherein the file system has meta data update operations and is operable to reserve one or more clusters free of reformatting as meta data update operations proceed and to write corresponding file allocation table entries and to log the file system operations in at least one such reserved cluster.

25A. The media device claimed in claim 25 wherein logged information is invisible to user when the device is connected to a Windows PC, whereby an unintentional erase of the log is prevented.

25B. The media device claimed in claim 25 wherein the file system is operable to create log records having respective log record state entries, and also to create a master log record having a plurality of corresponding second state entries so that each of the log record state entries respectively matches the corresponding one of the second state entries.

25C. The media device claimed in claim 25 wherein the file system has write operations and a root directory, and the write operations including root directory have such log data written to clusters specified as reserved.

25D. The media device claimed in claim 25 wherein said memory includes a non-volatile memory selected from the group consisting of: 1) NOR-flash, 2) NAND-flash, 3) ferroelectric RAM.

25E. The media device claimed in claim 25 further comprising an assembly holding said connector and said memory, and the device selected from the group consisting of: 1) MMC (Multi Media Card), 2) SD (Secure Digital) card, 3) Transflash card, 4) memory stick, 5) hard disk.

25F. The media device claimed in claim 25 wherein said file system is resilient as to loss and incorrect update of file system meta data and user data due to uncontrolled power failures.

29A. The electronic system claimed in claim 29 wherein the same power-fail-safe file system is operable for storing at least some modem data and operable as a PC-compatible file allocation table-based file system.

29B. The electronic system claimed in claim 29 wherein said modem is selected from the group consisting of: 1) cellular mobile phone modem, 2) WLAN wireless local area network modem, 3) voice over packet modem, 4) cable modem, 5) set top box modem, 6) WiMax modem, 7) automobile modem, 8) UWB (ultra wideband) modem.

29C. The electronic system claimed in claim 29 further comprising a camera coupled to said processor.

29D. The electronic system claimed in claim 29 further comprising an assembly mechanically holding said modem and said processor, said assembly selected from the group consisting of: 1) handset, 2) palmtop, 3) laptop, 4) desktop, 5) docking station, 6) projector, 7) digital camera, 8) video camera.

29E. The electronic system claimed in claim 29 further comprising a storage coupled to said processor, said storage selected from the group consisting of: 1) flash drive, 2) high density memory, 3) video storage, 4) hard drive, and 5) compact disk (CD).

29F. The electronic system claimed in claim 29 further comprising a printed circuit board mechanically holding said modem and said processor, and a serial interface coupled to said processor.

29G. The electronic system claimed in claim 29 further comprising a power management circuit coupled to said processor.

29H. The electronic system claimed in claim 29 wherein said modem includes a wireless interface selected from the group consisting of: 1) GSM, 2) GPRS, 3) EDGE, 4) UMTS, 5) OFDM, 6) MIMO, 7) CDMA, 8) HSDPA.

29J. The electronic system claimed in claim 29 further comprising a serial scan emulation interface coupled to said processor.

29K. The electronic system claimed in claim 29 wherein said processor is selected from the group consisting of: 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core.

29L. The electronic system claimed in claim 29 wherein said processor is operable to reserve at least one cluster to support the power-fail-safe file system, and is further operable according to the operating system to prevent such a reserved cluster from being modifiable by at least one application program running on said processor, whereby protection for the file system is enhanced.

29M. The electronic system claimed in claim 29 wherein the operating system for said processor is selected from the group consisting of: 1) Symbian, 2) Linux, 3) Windows.

32A. The electronic system claimed in claim 32 wherein at least one such multi-media application is selected from the group consisting of: 1) MP3, 2) video imaging, 3) video recording.

33A. The process claimed in claim 33 wherein if a power failure occurs before completion of the Logging operation, then on a subsequent reboot that log record is discarded.

33B. The process claimed in claim 33 wherein the Logging operation sets the state of the log record as ready before writing the meta data to the log record.

33C. The process claimed in claim 33 further comprising file system operations that include creation, write, rename and remove operations that update the file system meta data for a file or for a directory.

33D. The process claimed in claim 33 further comprising a file system write operation that, on a file, updates meta data including a file allocation table entry and file size for the file in a directory entry structure.

33E. The process claimed in claim 33 wherein the Logging forms a log table that contains multiple log records and a master log record.

33F. The process claimed in claim 33 wherein the meta data include directory entry structure data of a file or directory.

34A. The process claimed in claim 34 wherein if a power failure occurs after completion of the Logging operation and before completion of the Commit operation, then on a subsequent reboot that log record is used to perform and complete the Commit operation.

34B. The process claimed in claim 34 wherein, if a power failure occurs after the Commit operation, the meta data in the log record and elsewhere corresponding to that log record is retained as committed.

35A. The process claimed in claim 34 wherein the Commit operation is performed on each log record that has a corresponding ready entry in the master log record.

35B. The process claimed in claim 35 wherein, if a power failure occurs during the Logging operation so that the state of the log record is ready and the corresponding log entry of the master log record is other than ready, then on reboot the state of the log record is set to discarded instead, whereby meta data consistency is maintained in case of power failure.

35C. The process claimed in claim 35 wherein the Logging operation sets the corresponding entry in the master log record as ready after writing the meta data to the log record.

35D. The process claimed in claim 35 wherein the master log record includes some record entries each associated with a different log record and each such record entry containing data substantially describing the state of the associated log record as committed or not.

38A. The testing process claimed in claim 38 wherein the file system creates at least one log record in a reserved cluster when a data file is created.

38B. The testing process claimed in claim 38 further comprising performing the test process on another device when the testing process is completed as to the provided device.

Notes: Aspects are paragraphs which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

Processing circuitry comprehends digital, analog and mixed signal (digital/analog) integrated circuits, ASIC circuits, PALs, PLAs, decoders, memories, and programmable and nonprogrammable processors, microcontrollers and other circuitry. Internal and external couplings and connections can be ohmic, capacitive, inductive, photonic, and direct or indirect via intervening circuits or otherwise as desirable. "Ohmic" and "ohmically" refer to a coupling that is neither primarily capacitive nor indirect. Process diagrams herein are representative of flow diagrams for operations of any embodiments whether of hardware, software, or firmware, and processes of manufacture thereof. Flow diagrams and block diagrams are each interpretable as representing structure and/or process. While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in the detailed description and/or the claims to denote non-exhaustive inclusion in a manner similar to the term "comprising". The appended claims and their equivalents cover any such embodiments, modifications, and embodiments as fall within the scope of the invention.

What is claimed is:

1. A process of updating a file system allocation table in a storage media comprising:
   A. write a log record with updated meta data in a log table in non-volatile store;
   B. set a state of the log record to ready;
   C. set a corresponding ready entry in a master log record in non-volatile store;
   D. update file system meta data with log record meta data;
   E. change the log record state of ready to committed; and
   F. change the master log record state of ready to committed.

* * * * *